L. HELLER.
ELECTRIC HEATER.
APPLICATION FILED DEC. 10, 1915.
1,216,313.
Patented Feb. 20, 1917.
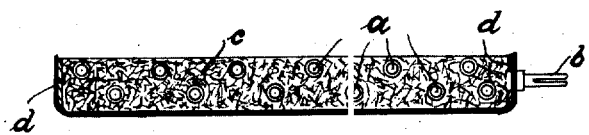
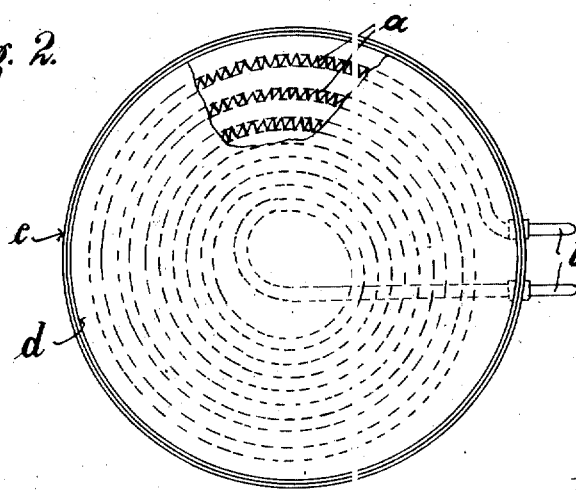
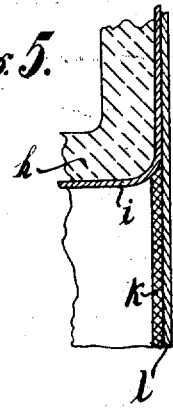
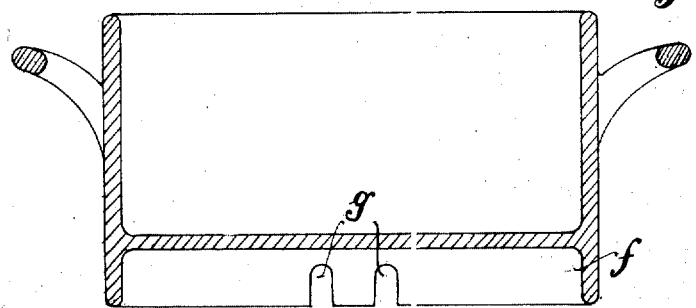
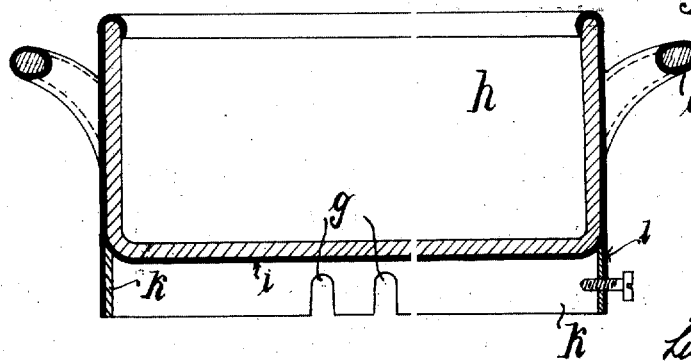

UNITED STATES PATENT OFFICE.

LEO HELLER, OF TEPLITZ, AUSTRIA-HUNGARY.

ELECTRIC HEATER.

1,216,313.  Specification of Letters Patent.  Patented Feb. 20, 1917.

Application filed December 10, 1915. Serial No. 66,163.

*To all whom it may concern:*

Be it known that I, LEO HELLER, a citizen of the Austro-Hungarian Empire, and residing at Teplitz, Bohemia, Austria-Hungary, have invented a certain new and useful Improved Electric Heater, of which the following is a specification.

This invention relates to an electric heating device for cooking utensils, particularly those made of earthenware, glass, china, metal china and the like.

It is already known to bring about the electric heating of cooking utensils and the like by the aid of electric heaters, the resistances of which are embedded in a suitable insulating substance such as cement, sand, powdered quartz, ceramic putty or the like. The employment of heaters of this kind however is accompanied with more or less difficulty because a sufficiently close contact between the vessel to be heated and the heater can only be secured by the employment of special means, such as screws or the like.

The object of the present invention is to obviate all these deficiencies in an absolutely reliable way without special mechanical aid, and in such a manner that close contact between the vessel and the heater is assured.

The invention consists in embedding the heater proper in a plate shaped metal or porcelain dish which is filled with an insulating substance in a plastic condition, the said substance consisting of 70% of pure ceramic clay, 20% of white pulverized gravel, 5% of crushed mica, and 5% of Preschen sand and which is inserted into a hollow space provided in the bottom of the vessel to be heated in such a way, that the insulating mass, which becomes completely hardened by heating through the resistance wires, adapts itself accurately to the under surface of the vessel.

This vessel of porcelain or earthenware is provided with a conductive coating, which enables specially quick heating by the heater in question to be obtained and is characterized by the fact, that on the bottom of the vessel a metal ring entirely uniform with the metal coating is arranged, being attached to the vessel by providing the same with a thin conductive deposit. The metal ring is then soldered or welded on to this thin deposit and then finally both the vessel and the ring are coated together with a thicker conductive deposit. Vessels of such construction give the best results due to the fact that on account of the uniform coating of ring and vessel the heat developed by the heater is evenly distributed over the entire outer surface of the vessel to be heated.

In order that the invention may be the better understood I will now proceed to describe the same in relation to the accompanying drawing reference being had to the letters and figures marked thereon. Like letters refer to the like parts in the various figures, in which:—

Figure 1 shows a vertical section,

Fig. 2 is a plan of the heater proper,

Fig. 3 is a vertical section through a porcelain vessel or the like intended for use with such heaters.

Fig. 4 is a like section through a similar vessel but having a conductive coating.

Fig. 5 is a section through the right bottom corner of the vessel shown on Fig. 4 on an enlarged scale.

Referring to the drawing *a* denotes the resistance wires secured to the contacts *b*, the said wires being suitably arranged in spirals in one or more planes, and embedded in an insulating mass *c* which consists of 70% of pure ceramic modeling clay, 20% of white pulverized gravel, 5% of crushed mica and 5% of Preschen sand. This compound has the advantage, that the heater can stand day and night under current, without intermission without burning out, while the heaters hitherto known inevitably burn out if one forgets to turn off the current after completion of the heating process.

In addition the heater possesses the further advantage, that the contents of the vessel continue to boil for 15 to 20 minutes after the current is turned off; consequently the current consumption is of course far lower than with previous devices of this kind. The heater proper formed in this way is, according to the invention, embedded in a plate shaped dish *e* having an inner lining *d* of asbestos or the like, the said dish after having been filled with the insulating compound being placed in the hollow space formed by the customary flange at the underside of the vessel to be heated so that the insulating mass, which is still in a plastic state, may adapt itself quite accurately to the shape of the bottom of the vessel. If now by turning on the electric current the heater is brought to incandescence or at least strongly heated, the insulating mass *c* becomes hardened in the form imparted to it by the bottom of the vessel and will consequently each time when used always lie perfectly close against the bottom surface of the vessel to be heated without the employment of mechanical means. Owing to the special nature of the insulating compound above described, a heater having an almost unlimited life is obtained even when subjected to the most severe use conceivable.

In order to adapt porcelain, china, or similar utensils or vessels for use with the above heater, the vessels are according to Fig. 3 appropriately provided on their lower edge with a depending annular flange $f$ having two recesses $g$ open from below, which are provided for the reception of the two contacts $b$ of the heater. Owing to this arrangement of the recesses $g$ any rotation of the heater in the space bordered by said annular flange $f$ is rendered quite impossible, so that the heating surface will always lie in exactly the same way against the bottom of the vessel to be heated.

In order to heat the entire outer surface of porcelain, china, or earthenware vessels by the use of a heater which merely heats the bottom of the vessel, the said vessels are provided with a conductive coating on the outer side by means of a process patented by the applicant, and the space formed by said depending flange and intended to receive the heater in such vessels may be provided by taking a vessel $h$ which has been initially provided with a thin coating $i$ and soldering or welding a metal ring $k$ of suitable height to the lower edge of the said vessel $h$ over the deposit $i$; the line of connection is neatly plastered up and both the vessel and the ring $k$ are together provided with a thin conductive coating $l$, which now connects the ring $k$ with the metal coating of the vessel $i$ and consequently with the vessel itself so as to make quite a uniform whole. If the heater is inserted into the ring $k$, which is of course provided with recesses $g$ for the contacts $b$ and heated, the heat developed is conveyed not only direct to the bottom of the vessel but also through the ring $k$ and the metal coating of the vessel to its side walls, thereby effecting the heating of such vessels with great speed and economy.

The contacts $b$ are kept out of contact with the metal ring $k$ by proper insulation in order to avoid a short circuiting of the electrical circuit.

Claim:

An electrical cooking apparatus of the character described, comprising a cooking utensil and an electric heating device provided respectively with heat transmitting surfaces, said cooking utensil being provided with a conductive outer covering, a recessed metal ring at the bottom of said utensil uniformly connected thereto by said conductive covering, and wires insulated from said ring and vessel and passing through the recesses in said ring, resistance wires embedded in an insulating mass at the bottom of said utensil, said wires being adapted to conductively connect the resistance wires to a source of energy, substantially as described.

In testimony whereof I affix my signature in the presence of two witnesses.

LEO HELLER.

Witnesses:
 ADOLF FISCHER,
 RUDOLF SCHOWICK.